(12) United States Patent
Nakano

(10) Patent No.: US 6,489,607 B1
(45) Date of Patent: Dec. 3, 2002

(54) OPTICAL DETECTOR

(75) Inventor: Yoichi Nakano, Narashino (JP)

(73) Assignee: Seiko Precision Inc. (JP)

( * ) Notice: Subject to any disclaimer, the term of this patent is extended or adjusted under 35 U.S.C. 154(b) by 0 days.

(21) Appl. No.: 09/616,646

(22) Filed: Jul. 14, 2000

(30) Foreign Application Priority Data

Jul. 21, 1999 (JP) .......................................... 11-205963

(51) Int. Cl.$^7$ ................................................ H01J 40/14
(52) U.S. Cl. ..................... 250/239; 250/216; 250/214.1
(58) Field of Search .............................. 250/214.1, 216, 250/239; 257/98, 99; 396/106, 111

(56) References Cited

U.S. PATENT DOCUMENTS

| 4,258,982 A | * | 3/1981 | Skinner et al. ............. 359/819 |
| 4,808,812 A | * | 2/1989 | Tanaka et al. .............. 250/216 |
| 6,052,232 A | * | 4/2000 | Iwaki ........................ 359/642 |

FOREIGN PATENT DOCUMENTS

GB 2244345 * 11/1991 ............ G02B/7/02

* cited by examiner

Primary Examiner—Robert H. Kim
Assistant Examiner—Chih-Cheng Glen Kao
(74) Attorney, Agent, or Firm—Adams & Wilks

(57) ABSTRACT

An optical detector is formed so that gate traces formed during molding of a lens member do not allow additional stray light to enter a light detecting element. A lens member for focusing incident light is mounted forward of a cylinder used for blocking extraneous light. An IC light detecting device used for range-finding is mounted behind the cylinder. The lens member has lens portions and a peripheral portion surrounding the lens portions. The lens portions and the peripheral portion are integrally molded from a transparent plastic material. Positioning protrusions extend from an outer peripheral surface of the lens member. Recessed portions in which the positioning protrusions can be engaged are formed in a front outer peripheral portion of the cylinder. Gate traces formed during molding are located in the positioning protrusions. Consequently, additional recessed portions are not needed to accommodate the gate traces.

16 Claims, 4 Drawing Sheets

OPTICAL DETECTOR

FIELD OF THE INVENTION

The present invention relates generally to an optical detector for use in a camera or like instrument and, more particularly, to an optical detector having reduced sensitivity to stray light and to a method of producing an optical detector with reduced sensitivity to stray light.

BACKGROUND DISCUSSION

As illustrated in FIG. 5, a known optical detector for use in a camera or the like has an IC b used for performing range-finding functions. The IC b is located rearward of a cylinder a used for blocking extraneous light. A lens member c is placed forward of the cylinder a with respect to incident light, and the lens member focuses incident light and projects the focused light through the cylinder a, whereupon it is incident on a light detecting element in the IC b so that processing can be performed to determine information such as distance, light level, and the like.

In the known optical detector, the lens member c typically comprises a transparent plastic member integrally molded in the form of a single piece of plastic material. For proper positioning of the lens member c relative to the cylinder a, a pair of protrusions (referred to herein at times as assembly protruding portions) d extend from both longitudinal end surfaces of the lens member c. The lens member c is assembled over the cylinder a, which has recesses or recessed portions (referred to at times herein as assembly recessed portions) e formed therein in correspondence with the assembly protruding portions d. As shown, the protruding portions d and recessed portions e are formed so as to engage each other such as by a friction or snap fit. Alternatively, the recesses e may simply be formed to properly orient the lens member c in proper position with respect to the cylinder a.

Since the lens member c is formed of injection molded plastic, an additional protrusion (referred to herein interchangeably as a gate trace portion, an injection molding port trace portion, or simply a trace portion) f, formed at a location on the lens member c facing an injection port where plastic material is supplied to a mold cavity during molding of the lens member, extends from the lower end surface of the lens member c. In other words, because the lens member c is an injection molded part, a trace portion of plastic material forms an additional projection at a location of an injection port of an injection molding machine used to fabricate the lens member c. To accommodate the trace portion f so that the lens member c is properly received by the cylinder a, an additional recess a must be formed in the cylinder a.

Another optical detector is shown in FIG. 6. As illustrated, a pair of protrusions i used for assembly extend from vertically opposite end surfaces of a lens member h. A corresponding pair of recesses or recessed portions k are formed in the top and bottom surfaces of a cylinder j. The protrusions i and the recessed portions k are formed to engage each other. A pair of gate trace portions or protrusions m extend from the longitudinally opposite end surfaces of the lens member h. Additional recesses n are formed in the cylinder j to accommodate the gate trace portions m.

In the above-described optical detectors, the cylinder is formed with a sidewall that extends vertically upward to surround the peripheral sidewall of the lens member. However, the recesses formed in the cylinder sidewall do not surround the lens member at the pair of protrusions used for positioning and assembly of the lens member with respect to the cylinder, and the one or more additional protrusions formed by trace amounts of plastic resulting from the molding process. These protrusions extend from the lens member and are received in recesses formed in the sidewall of the cylinder. Since the cylinder must be provided with a sufficient number of recesses to accommodate each of the protrusions, the cylinder has a reduced area in the periphery thereof for which to surround the lens member. Hence, the above-described optical detectors are susceptible to stray light. It is therefore desirable to minimize the number of protrusions extending from the peripheral sidewall of the lens member and the corresponding recesses formed in the cylinder.

Furthermore, during molding, the position of the injection molding port may be varied with respect to the mold cavity of the member. As a result, the die for molding of the cylinder must be changed. This is uneconomical and increases the production cost.

SUMMARY OF THE INVENTION

In view of the foregoing shortcomings, it is an object of the present invention to provide an injection molded part having a protrusion formed by an injection molding port located at a non-mating surface of the part.

Another object of the present invention is to provide an optical detector with reduced susceptibility to stray light.

Yet another object of the present invention is to provide an optical detector having a lens member and a cylinder, in which one or more gate trace portions formed on the lens member as a result of injection molding are located at surface of the lens member which does not mate with the cylinder.

Still another object of the present invention is to provide an optical detector having a lens member and a cylinder, wherein one or more gate trace protrusions formed on the lens member as a result of injection molding are formed at positioning protrusions of the lens member used for positioning and/or assembly of the lens member with the cylinder. Where the positioning protrusions at which the gate trace portions are located are plural in number, the positioning protrusions are preferably symmetrically arranged.

To satisfy the above objects and others, the present invention provides an optical detector comprising a lens member for focusing and projecting incident light, a cylinder mounted to the lens member for passing the focused light and blocking extraneous light, and an optical detecting device mounted rearward of the cylinder for receiving the focused light passed through the cylinder. The lens member comprises one or more lenses and a peripheral portion surrounding the lenses, and the lenses and the peripheral portion are preferably integrally molded of a transparent plastic material. Positioning protrusions extend from an outer peripheral surface of the lens member. The cylinder has a sidewall formed with recesses for receiving the positioning protrusions of the lens member. Injection molding port trace portions formed during molding of the lens member protrude from the positioning protrusions and not from a surface of the lens member which mates with a surface of the cylinder.

Since the injection molding port trace portions formed during molding of the lens member are located at the positioning protrusions as described above, a maximum area of the lens member can be surrounded by the cylinder sidewall. Also, if the injection molding port position is modified during molding, it is not necessary to change the die for molding of the cylinder.

In addition, the positioning protrusions in which the gate traces are formed are preferably plural in number and symmetrically arranged.

DETAILED DESCRIPTION OF THE PREFERRED EMBODIMENTS

Figure 1:
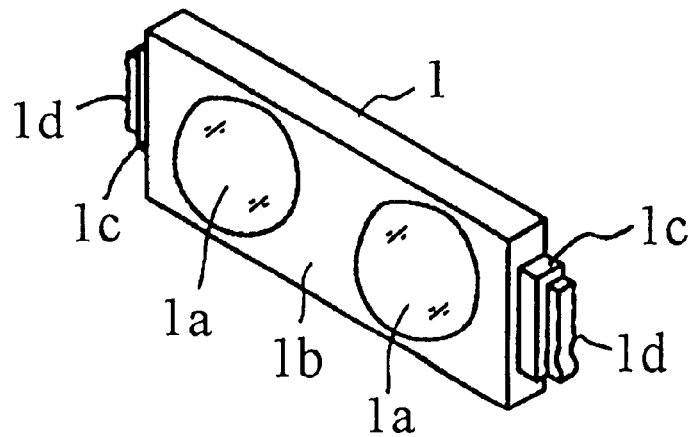
FIG. 1 is a perspective view showing an embodiment of a lens member in accordance with the present invention.

Various preferred embodiments of the present invention are described hereinbelow with reference to the drawings. A lens member 1 is shown in FIG. 1. The lens member 1 has two lenses 1a, 1a which are horizontally spaced from each other and located at opposite ends of the lens member 1. The horizontally extending lens member 1 is formed integrally with a peripheral portion 1b surrounding the two lenses 1a, 1a. The lens member 1 is integrally molded from a transparent plastic material such as acrylic resin.

Positioning protrusions 1c, 1cfor positioning of the lens member 1 during assembly extend from the longitudinally opposite end surfaces of the lens member 1.

During molding of the lens member 1, an injection molding port for supplying a plastic material into a mold cavity is located opposite each of the end surfaces of the positioning protrusions 1c, 1c and in contact with the end surfaces. Therefore, after molding, additional protrusions 1d, 1d formed by traces of plastic remain. As described below, the additional protrusions 1d, 1d do not extend from a surface of the lens member 1 which mates with a surface of a light-blocking member or cylinder 2.

Figure 2:
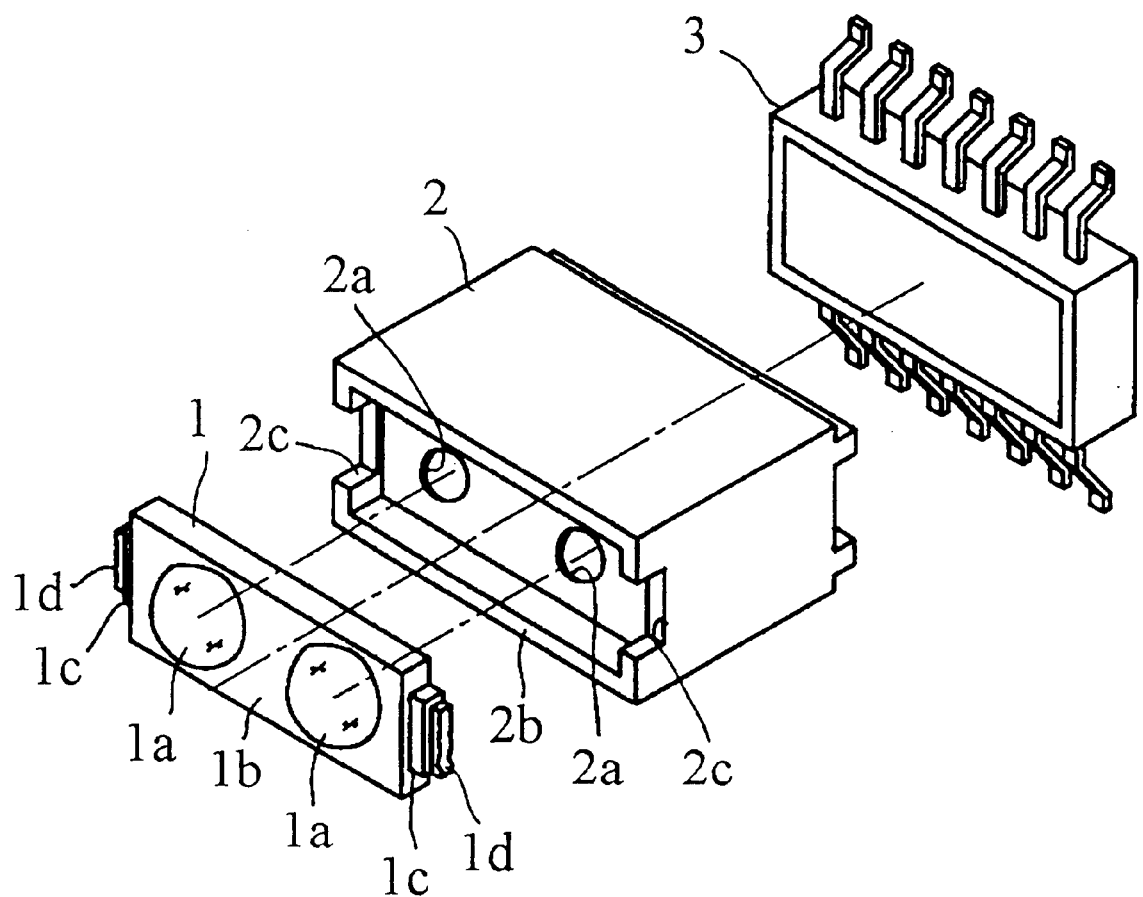
FIG. 2 is an exploded perspective view of an optical detector according to the present invention.

As shown in FIG. 2, a light-blocking member in the form of a cylinder 2 for blocking extraneous light is located behind the lens member 1. Holes 2a, 2a are formed in a front portion of the cylinder 2 located opposite to and coaxially with the lens portions 1a, 1a, respectively. Recessed portions 2c, 2c in which the positioning protrusions 1c, 1c can be engaged are formed in an outer peripheral sidewall 2b. Therefore, the only portions of the outer peripheral sidewall 2b of the cylinder 2 that do not cover the side surfaces of the lens member 1 are at the recessed portions 2c, 2c where the positioning protrusions 1c, 1c are located. As a result, the effects of stray light can be reduced to a minimum. An optical detecting device such as a range-finding IC 3 is mounted behind the cylinder 2.

Figure 3:
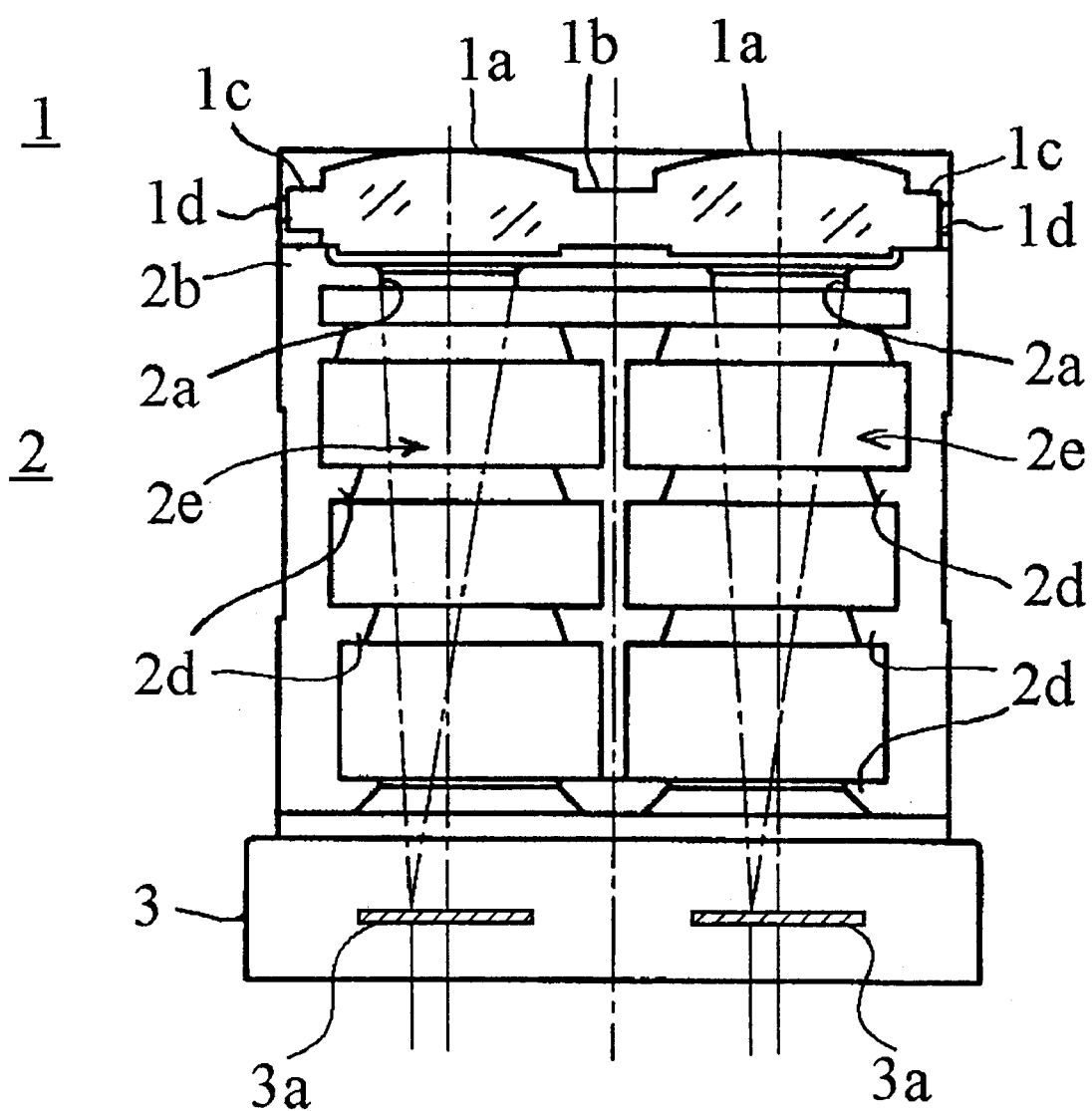
FIG. 3 is a cross-sectional view of the optical detector of FIG. 2 in an assembled state.

FIG. 3 is a cross-sectional view of the foregoing structure. Light-sensitive elements 3a, 3a are positioned in the range-finding IC 3 and located opposite to the lens portions 1a, 1a. A hollow portion 2e continuous with and surrounding the holes 2a, 2a is formed inside the cylinder 2. Plural stages of annular flanged portions 2d protrude inwardly from the inner surface of the hollow portion 2e. Since the lens member 1 is formed of a wholly transparent body, extraneous light that enters from other than the lens portions 1a, 1a and does not contribute to a range-finding operation, i.e., secondary light, is blocked by the flanged portions 2d and thus is not received by the light-sensitive elements 3a, 3a.

Figure 4:
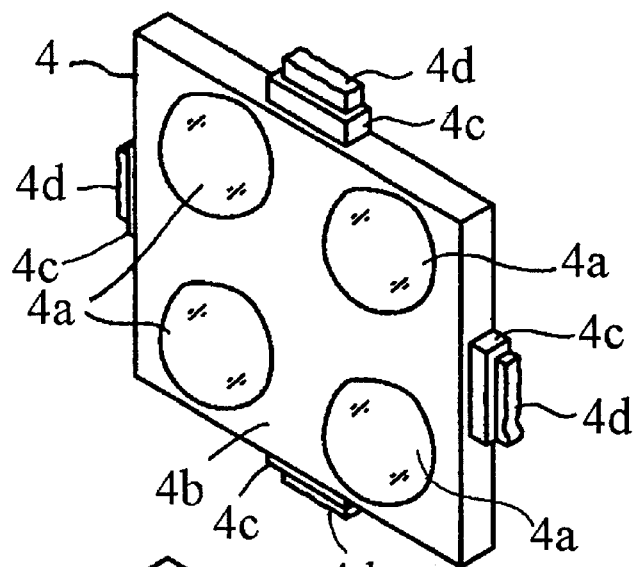
FIGS. 4(a), 4(b), and 4(c) are perspective views of other embodiments of a lens member in accordance with the present invention.
Figure 4:
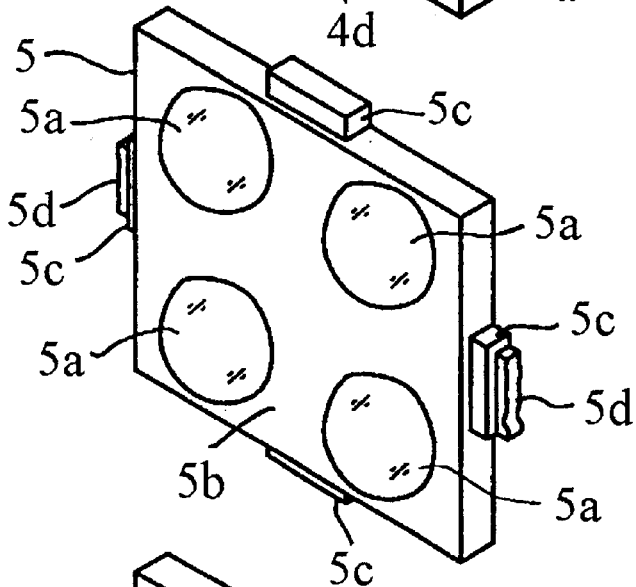
Figure 4:
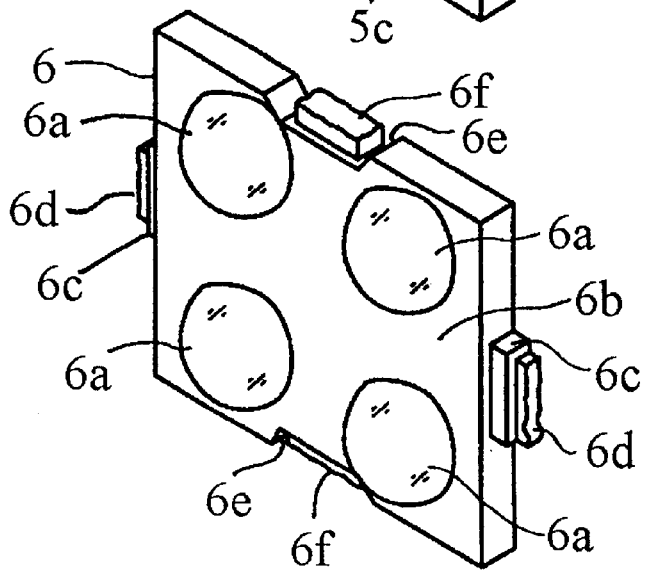
Figure 5:
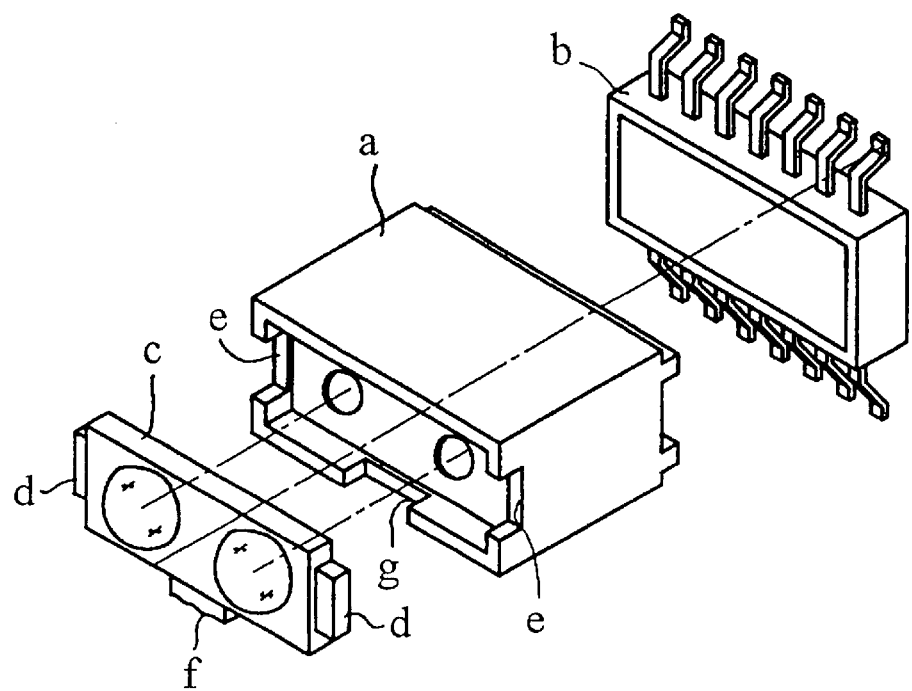
FIG. 5 is an exploded perspective view of a known optical detector.
Figure 6:
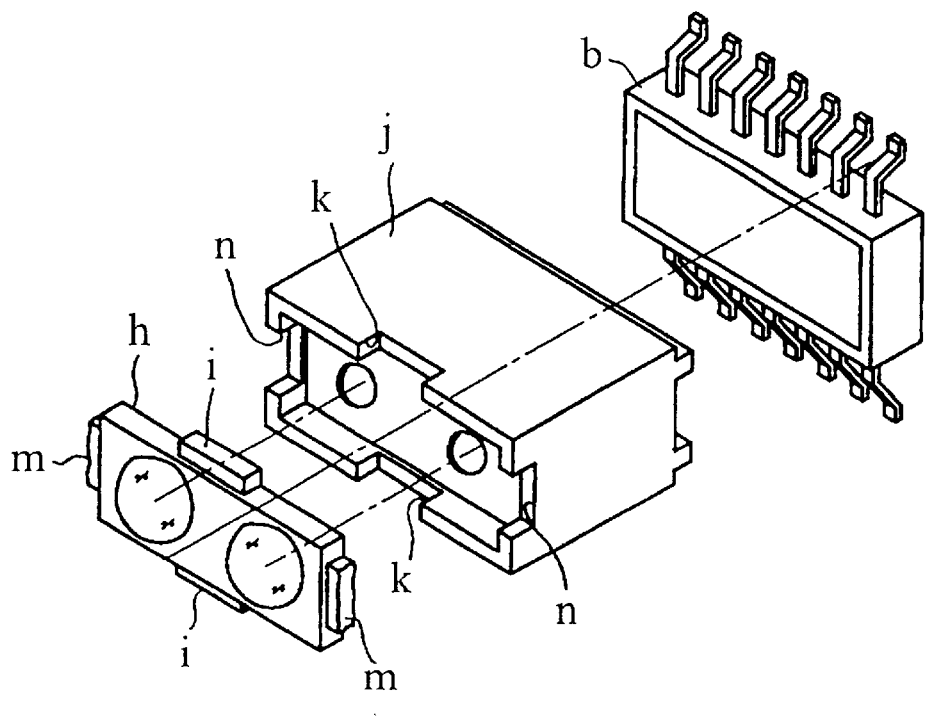
FIG. 6 is an exploded perspective view of another known optical detector.

FIG. 4 shows another embodiment illustrating a lens member or an object lens for use in a sequential-shot camera that is used for a so-called multiple range finding operation and having two or more lenses (e.g., four lenses in the illustrated embodiment) to take improved photographs. A lens member 4 shown in FIG. 4(a) has four lenses 4a and a surrounding portion 4b that are integrally molded. The lens member 4 has a substantially square shape. Positioning protrusions 4c are formed at the four end surfaces. In the same manner as in FIG. 1, gate traces 4d formed during molding protrude from the end surfaces of the positioning protrusions 4c.

In the lens member 5 shown in FIG. 4(b), four lenses 5a and a surrounding portion 5b are integrally molded and assume a substantially square form, and assembly protrusions 5c are formed on the four end surfaces, in the same manner as in the foregoing embodiment. In this embodiment, however, the gate traces 5d, 5d formed during molding protrude only from the end surfaces of the symmetrically arranged positioning protrusions 5c, 5c. The gate traces formed during molding do not protrude from the end surfaces of the other symmetrically arranged positioning protrusions 5c, 5c. In this case, if a plastic material is supplied from two injection ports located symmetrically, the plastic material is uniformly supplied to the whole lens member 5. The quality of the finished product is not decreased because four injection ports are not used as in the foregoing embodiment.

In the lens member 6 shown in FIG. 4(c), four lenses 6a and a surrounding portion 6b are integrally molded and assume a substantially square form. Positioning protrusions 6c, 6c are formed at two end surfaces located symmetrically. Gate traces 6d, 6d formed during molding protrude from the end surfaces of these positioning protrusions 6c, 6c in the same manner as in the foregoing embodiments. However, no positioning protrusions are formed on the other two symmetric end surfaces. Instead, recesses 6e, 6e for the gate traces formed during molding are formed in this embodiment. Gate traces 6f, 6f formed during molding protrude into these recesses 6e, 6e. Therefore, a plastic material can be uniformly supplied to the whole lens member 6 from the four gates. At the same time, because of the presence of the recesses 6e, 6e, the gate traces 6f, 6f protruding into the recessed portions do not protrude from the outer peripheral portion of the lens member 6. Accordingly, it is not necessary to form extra recessed portions in the cylinder to accommodate the gate traces. Consequently, entry of stray light into the lens member 1 can be minimized.

In the above-described embodiments, the lens member has two or four lenses. As will be appreciated, the present invention is not limited to any specific number of lenses.

In accordance with the present invention, gate traces formed during molding are located in positioning protrusions as described above. This increases the area of the portion of the cylinder that covers the lens member. Hence, the device is less susceptible to adverse affects from stray light. During molding, if the gate positions are modified, it is not necessary to change the shape of the cylinder Furthermore, the device is easy to fabricate and the invention is effective in reducing the overall cost and performance of a finished product. Because plural positioning protrusions in which gate traces are left are located symmetrically, a plastic material is supplied uniformly during molding. The quality of the finished product can thus be improved.

What is claimed is:

1. An optical detector comprising: an optical detecting device; a lens member formed by injection molding and disposed forward of the optical detecting device for focusing and projecting incident light and comprising plural lenses and a peripheral portion surrounding the lenses; and a cylinder disposed between the lens member and the optical detecting device for blocking extraneous light; wherein a plurality of positioning protrusions are formed on a sidewall of the lens member and corresponding recesses for receiving the protrusions are formed in a sidewall of the cylinder, so that when the protrusions are inserted into the recesses, the sidewall of the lens member is covered by the sidewall of the cylinder, except where the recesses are formed, to prevent stray light from entering the sidewall of the lens member; and wherein at least one gate trace formed by an injection molding port during injection molding of the lens member is located at a surface of the lens member that does not mate with a surface of the cylinder.

2. An optical detector according to claim 1; wherein the lenses and the peripheral portion of the lens member are integrally molded of a transparent plastic material.

3. An optical detector according to claim 1; wherein the at least one gate trace comprises plural gate traces located on different ones of the protrusions.

4. An optical detector comprising: an optical detecting device for detecting incident light; an injection-molded lens member disposed forward of the optical detecting device and having one or more protrusions and a trace portion formed on at least one of the protrusions during injection molding, the lens member having plural lenses for focusing and projecting incident light toward the optical detecting device and a peripheral portion surrounding the lenses; and a light-blocking member disposed between the lens member and optical detecting device for blocking extraneous light from reaching the optical detecting device and having one or more recesses for accommodating the one or more protrusions, so that the trace portion is not formed on a peripheral mating surface of the lens member engaged with a mating surface of the light-blocking member.

5. An optical detector according to claim 4; wherein the trace portion comprises a plurality of trace portions formed on symmetrically arranged protrusions.

6. An optical detector according to claim 5; wherein the one or more protrusions comprise a plurality of protrusions and a trace portion is formed on some but not all of the protrusions.

7. An optical detector according to claim 6; wherein the trace portions are located on protrusions disposed on opposite ends of the lens member.

8. An optical detector according to claim 4; wherein the one or more protrusions comprise a plurality of protrusions and a trace portion is formed on each of the protrusions.

9. An optical detector according to claim 8; wherein the lens member has one or more recesses, and a trace portion is formed in the one or more recesses so that the trace portions are not located on the peripheral mating surface of the lens member.

10. An optical detector according to claim 4; wherein the lenses and the peripheral portion of the lens member are integrally molded of a transparent plastic material.

11. An optical detector according to claim 1; wherein the optical detecting device comprises an integrated circuit device having optical detecting elements disposed in a package.

12. An optical detector according to claim 11; wherein a first end of the cylinder is attached to the package of the integrated circuit device such that light passing through the cylinder is projected onto the optical detecting elements.

13. An optical detector according to claim 12; wherein a second end of the cylinder opposite the first end is attached to the lens member so that light passing through the lenses is passed through the cylinder and incident on the optical detecting elements.

14. An optical detector according to claim 4; wherein the optical detecting device comprises an integrated circuit device having optical detecting elements disposed in a package.

15. An optical detector according to claim 14; wherein a first end of the cylinder is attached to the package of the integrated circuit device such that light passing through the cylinder is projected onto the optical detecting elements.

16. An optical detector according to claim 15; wherein a second end of the cylinder opposite the first end is attached to the lens member so that light passing through the lenses is passed through the cylinder and incident on the optical detecting elements.

* * * * *